March 11, 1941.                    W. OWENS                    2,234,774
                            AUTOMATIC HYDRANT DRAIN
                             Filed May 17, 1940          2 Sheets-Sheet 1
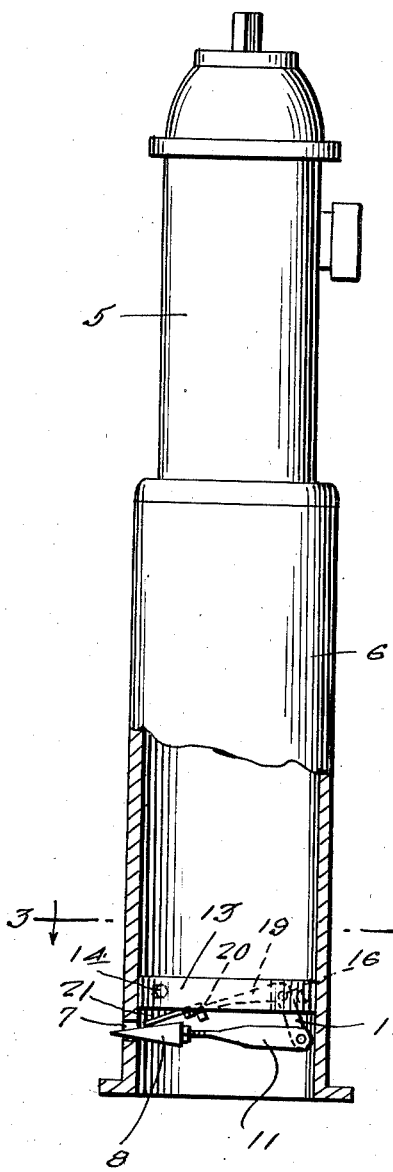
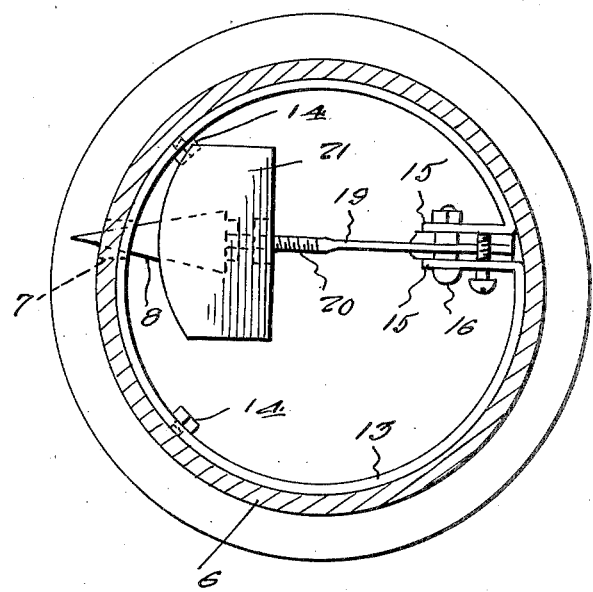
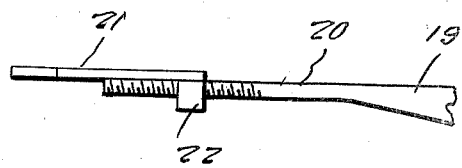
Inventor
William Owens
By Clarence A. O'Brien
Attorney

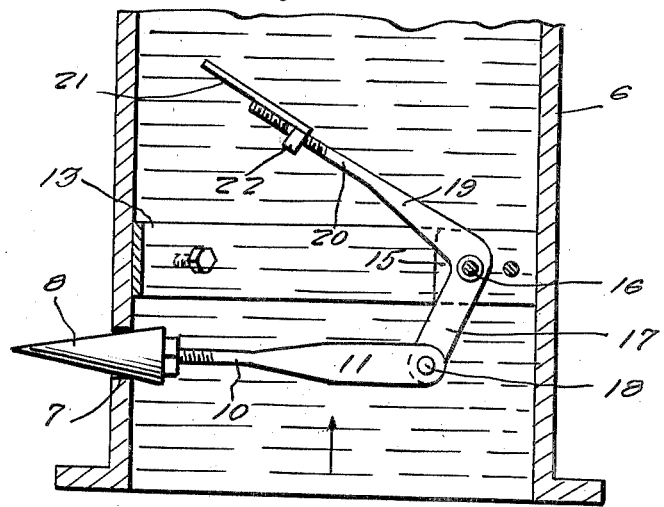
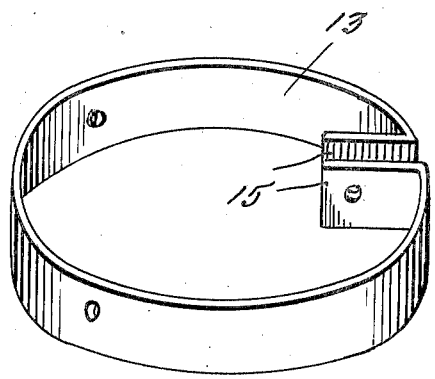
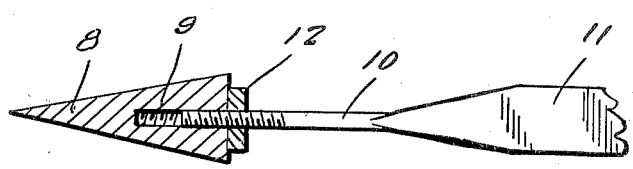

Patented Mar. 11, 1941

2,234,774

UNITED STATES PATENT OFFICE 2,234,774

AUTOMATIC HYDRANT DRAIN

William Owens, Nevada, Mo.

Application May 17, 1940, Serial No. 335,864

2 Claims. (Cl. 137—152)

This invention relates to improved drain means for fire hydrants and an object of the invention is to provide a drain which is substantially automatic in operation; characterized by fewness of parts, and which will otherwise be found well-adapted for the purposes intended.

The invention together with its objects and advantages will be best understood from a study of the following description taken in connection with the accompanying drawings wherein—

Figure 1 is an elevational view of a hydrant with parts broken away and illustrating the application of the invention thereto.

Figure 2 is an enlarged detail sectional view through the lower portion of the casing of the hydrant and showing the drain valve in fully closed position.

Figure 3 is a horizontal sectional view taken substantially on the line 3—3 of Figure 1.

Figure 4 is a perspective view of an attaching ring or frame forming part of the invention.

Figure 5 is a fragmentary detail view partly in section and partly in elevation showing a conical valve plug, arm therefor, and the adjustable connection between the arm and the plug.

Figure 6 is a side elevational view of a pressure responsive plate and a supporting arm therefor, and showing the adjustable connection between said plate and arm.

Referring more in detail to the drawings it will be seen that 5 indicates a conventional fire hydrant from which depends into the ground in the usual manner a casing 6.

The casing 6 is hollow and after use of the hydrant the casing generally becomes filled with water and during cold weather the water soon freezes rendering the hydrant unfit for use until the water has been thawed out.

In accordance with the present invention the casing 6 adjacent the bottom thereof is provided with a drain opening 7 and for this opening 7 there is provided a conical valve plug 8.

The plug 8 as shown in Figure 5 is provided with a threaded axial socket 9 for the threaded reception of the threaded shank 10 of an arm 11 provided for the plug.

The plug 8 is positively secured at the desired position of adjustment on the shank arm 10 through the medium of a lock nut 12 as also shown in Figure 5.

Further in accordance with the present invention there is provided a substantially annular frame or split band 13 that fits within the casing 6 immediately above the opening 7 and is secured in position within the casing 6 through the medium of suitable fastening elements 14.

The ends formed by the split in the band 13 are directed radially inwardly of the band as shown in Figure 4 and are apertured to provide a pair of substantially parallel ears or lugs 15.

Pivoted between the ears or lugs 15 as at 16 is a lever 17 to one end of which is pivoted as at 18 the aforementioned valve plug supporting arm 11. It will thus be seen that rocking movement of the lever 17 is transmitted to the valve plug 8 for shifting the latter axially relative to the opening 7 for opening and closing the drain port 7.

Integral with the lever 17 at the end thereof remote from the pivot 18, and extending substantially at right angles to the lever 17 is an arm 19. The arm 19 terminates in a threaded shank 20 to which is attached a relatively flat plate 21 that may be of any suitable shape but is preferably of the shape suggested in the drawings.

The plate 21, in the present instance, is equipped adjacent one edge thereof with a threaded lug 22 that threads on the shank 20, as shown in Figure 6, whereby the plate 21 is secured on the shank 20 at the desired position of adjustment longitudinally of said shank.

Normally the plate 21 is in the lowered position suggested in Figure 1 and the valve 8 is in a retracted position with respect to the port 7 so that the port 7 is substantially open to permit water to drain from the casing 6.

During the use of the hydrant, the water passing upwardly through the casing 6 will impinge on the plate 21 causing the latter to move upwardly with arm 19 resulting in a swinging movement of the lever 17 in a clockwise direction. This movement of the lever 17 causes the arm 11 to move in a direction to project the valve plug 8 outwardly through the port 7 and into seating engagement with the port 7 for preventing the flow of water outwardly of the casing through said port. Thus while the hydrant is in use there will be no waste of water through the drain port 7.

After the water has been turned off, the water within the casing 6 above the port 7 will drain from the casing through the port, the pressure of the water upwardly through the casing having been shut off. Consequently by its own weight plate 21 will move to the lowered position shown in Figure 1 from substantially the position shown in Figure 2 causing the plug 8 to be drawn inwardly of the casing to the port opening position shown in Figure 1, and consequently permitting such drainage of the water from the casing.

The valve plug 8 being of conical form is substantially self-cleaning and consequently not likely to stick within the port 7. As a result smooth function or operation of the drain service is materially assured and consequently the possibility of the hydrant becoming frozen during cold weather is practically entirely eliminated.

It is thought that a clear understanding of the manner of installing the drain device, its manner of operation, utility and advantages will all be apparent from the foregoing.

It is to be further understood that while I have herein shown and described a preferred embodiment of the invention, it is in no wise intended to restrict the invention to the precise details of construction, combination and arrangement of elements as herein illustrated and described other than as required by the prior art and scope of the appended claims.

Having thus described the invention what is claimed as new is:

1. In a device of the class described, a casing for the passage of liquid having a drain port therein, a bellcrank lever pivotally arranged in the casing, a shank pivoted to one end of the lever, a conical valve adjustably connected to the shank and passing through the port, the other end of the lever being screw-threaded, a plate and a nut attached to the plate and threaded on said threaded end of the lever, said plate causing the valve to close when acted upon by liquid passing through the casing and said plate dropping by gravity to open the valve when the flow of water through the casing is checked.

2. In a device of the class described, a vertically arranged casing for the passage of liquid and having a drain port in its lower part, a ring fastened in the casing above the port and having inwardly extending ears thereon arranged opposite the port, a bellcrank lever pivoted between the ears and having one arm extending downwardly and the other arm extending upwardly, the second arm being of greater length than the first arm and having its end threaded, a shank having one end pivoted to the lower end of the depending arm, a conical valve connected with the other end of the shank and passing through the port and a plate having a threaded projection on one face thereof through which the threaded part of the upper arm of the lever passes.

WILLIAM OWENS.